(12) United States Patent
Anderson

(10) Patent No.: US 6,174,593 B1
(45) Date of Patent: Jan. 16, 2001

(54) HIGH FRICTION CAN SEPARATOR PAD

(75) Inventor: Gary W. Anderson, Mount Juliet, TN (US)

(73) Assignee: Reemay, Inc., Old Hickory, TN (US)

( * ) Notice: Under 35 U.S.C. 154(b), the term of this patent shall be extended for 0 days.

(21) Appl. No.: 09/197,654

(22) Filed: Nov. 23, 1998

Related U.S. Application Data

(63) Continuation-in-part of application No. 09/129,150, filed on Aug. 5, 1998, now abandoned.

(51) Int. Cl.$^7$ ....................................................... B32B 5/12
(52) U.S. Cl. .......................... 428/213; 428/141; 428/156; 428/219; 428/340; 428/516; 428/523; 211/59.4; 442/104
(58) Field of Search ................................. 428/213, 141, 428/219, 340, 156, 500, 515, 516; 442/394, 398, 62, 64, 65, 79, 85, 86, 97, 101; 108/901; 211/59.4

(56) References Cited

U.S. PATENT DOCUMENTS

| | | | |
|---|---|---|---|
| 3,666,604 | * | 5/1972 | Coffet ........................................ 161/2 |
| 4,262,051 | * | 4/1981 | Welz et al. ............................ 428/283 |
| 4,507,348 | * | 3/1985 | Nagata et al. ........................ 428/172 |
| 4,748,070 | * | 5/1988 | Beehler ................................ 428/198 |
| 4,961,983 | * | 10/1990 | Smorada et al. ..................... 428/121 |
| 5,080,960 | | 1/1992 | Smorada ................................ 428/43 |

OTHER PUBLICATIONS

Brochure entitled *TYPAR Separator Sheets–Innovative Packaging for the Food and Beverage Industry*, Reemay, Inc. of Old Hickory, Tennessee, TS–91001, 1991.

* cited by examiner

*Primary Examiner*—Ellis Robinson
*Assistant Examiner*—Alicia Chevalier
(74) *Attorney, Agent, or Firm*—Alston & Bird LLP

(57) ABSTRACT

A separator pad for use in transporting stacked equal-height containers comprised of a liquid and gas impervious polymer film overlying a flexible core fabric. The core fabric preferably has a basis weight from about six to about eleven ounces per square yard, and the overall thickness of the pad preferably is from about 20 to about 40 mils. The polymer film, such as a polypropylene film, is chill rolled with rolls having a polished finish to impart a high friction gloss surface on the separator pad. The gloss-finish separator pad should have an average static coefficient of friction of at least 0.35, and an average kinetic coefficient of friction of at least 0.2. Due to the high friction surface, the separator pad prevents containers such as aluminum cans from falling during transport.

11 Claims, 3 Drawing Sheets

HIGH FRICTION CAN SEPARATOR PAD

CROSS-REFERENCE TO RELATED APPLICATIONS

This application is a continuation-in-part of application Ser. No. 09/129,150 filed Aug. 5, 1998, now abandoned.

FIELD OF THE INVENTION

The present invention relates to sheets or pads, and more particularly to sheets or pads for separating vertically stacked groups of containers.

BACKGROUND OF THE INVENTION

The canning or bottling of beverages typically requires that empty beverage containers be shipped from a container manufacturer to the beverage manufacturer where they are filled using an automated filling machine. In the case of canned soft drinks and beer, the empty cans are ordinarily sent to the beverage manufacturer in large quantities, and are typically stacked on pallets for shipment. To facilitate shipment to the beverage manufacturer, it is common for layers of equal-height cans to be tightly packed on a pallet, with each layer of cans being covered with a separator sheet which provides a surface for a next layer of cans to be placed. This process is repeated until the desired number of cans is stacked on the pallet. The stack of cans is then covered with a top frame, which can be made of plastic, wood, or other materials, and the pallet of stacked cans is secured for shipment. When using separator sheets of this type, a typical pallet may contain as many as about 20 layers having 400 cans per layer, or 8000 cans.

The separator pads must be designed to allow uncomplicated palletizing and depalletizing of the cans while simultaneously preventing cans from slipping out from the stack and falling off the pallet. Furthermore, the material used must be suitable in terms of sanitation, flavor-producing agents, and durability. Separator pads have previously been made from a chipboard material containing cellulose materials and a binder. Because the cellulose-based material is porous, insects and moisture could enter the sheet and cause contamination. Additionally, the chipboard sheets were sometimes found to emit an undesired flavor into the unfilled cans which, once filled, ultimately changed the flavor of the product. The chipboard sheets were also easily damaged, thus limiting their useful life.

A reusable composite polymer-based sheet has since been designed to overcome the disadvantages associated with the chipboard separator sheets. Such a sheet is disclosed in U.S. Pat. No. 5,080,960, the disclosure of which is hereby incorporated by reference. The sheet described in that patent comprises a central core of high basis weight, nonwoven, spunbonded fabric which is coated with a polymer layer that is finely roughened during processing resulting in a sheet with a matte finish. To overcome several disadvantages of the prior art, including the chipboard sheets, the sheet was designed to be flexible yet shape retaining, tear-resistant, and otherwise durable. In addition, the sheet was designed to expedite the palletizing and depalletizing of the cans, allowing the cans to easily slide on and off the pallets, facilitating palletizing operations.

However, it has been found that as the can weight is decreased in order to lower costs, cans occasionally fall off during palletizing, shipment, depalletizing, and other times when the cans are moved.

SUMMARY OF THE INVENTION

The present invention provides a separator sheet which overcomes the limitations and disadvantages of the conventional chipboard and more recent composite polymer-based separator sheets. Like the prior composite polymer-based sheets, the separator sheet of the present invention is shape-retaining, tear-resistant, non-porous, and non-toxic. However, in accordance with the present invention, the separator sheet disclosed herein has a high friction surface which prevents the fallout of cans that may occur during shipment. In particular, the separator sheet has a gloss finish in lieu of the matte finish of the prior matte finish composite polymer-based sheet. The gloss finish has higher static and kinetic coefficients of friction than the previous matte-finish separator sheets, and thus is significantly more effective in preventing can movement and fallout. Although the static and kinetic coefficients of friction are significantly higher, the kinetic coefficient of friction produced by the gloss finish does not impede the sliding of the cans during loading and unloading, thus facilitating successful palletizing and depalletizing of the cans.

The separator sheet of the present invention comprises a flexible sheet which is coated on both sides with a polymer layer having a smooth finish, resulting in a static coefficient of friction that is at least 0.35, measured in accordance with ASTM test method D1894-93. To ensure proper can retention, both sides of the separator sheet should have the threshold static coefficient of friction of at least 0.35. A static coefficient of friction of at least 0.35 provides the necessary friction to discourage can movement, and specifically can fallout, during transport. The unique surface characteristics of the separator sheet of the present invention may alternatively be defined by a standard surface gloss measurement. Sheets having the desired frictional properties also possess a surface gloss of at least 20, as determined in accordance with ASTM Test Method D-523 (60 degree gloss measurement). Both surfaces of the sheet should desirably have this minimum surface gloss value.

The core layer preferably consists of a high basis weight, nonwoven spunbonded fabric similar to that used in the aforementioned matte-finish sheet. The high friction surface is then imparted by applying a polymer layer to the core layer and forming a smooth gloss surface on the polymer layer, e.g. with a chill roll having a polished finish. The gloss finish gives the surface of the sheet higher static and kinetic coefficients of friction than the rougher matte-finish sheet. By having a gloss surface, more surface area of the sheet contacts the cans, thus increasing the friction therebetween. With a matte-finish sheet, the rough, grainy surface decreases the surface area which contacts the cans, thus reducing the relative friction between the sheet and the cans.

While the gloss and matte finish sheets cost more than chipboard sheets, they have been found to last significantly longer making them a more cost effective design.

BRIEF DESCRIPTION OF THE DRAWINGS

Some of the features and advantages of the invention having been described, others will become apparent from the detailed description which follows, and from the accompanying drawings, in which.

DESCRIPTION OF ILLUSTRATED EMBODIMENTS

The present invention will be described more fully hereinafter with reference to the accompanying drawings in which a preferred embodiment of the invention is shown. This invention may, however, be embodied in different forms and should not be construed as limited to the embodiments set forth herein; rather these embodiments are provided so that this disclosure will be thorough and complete and will fully convey the scope of the invention to those skilled in the art.

Figure 1:
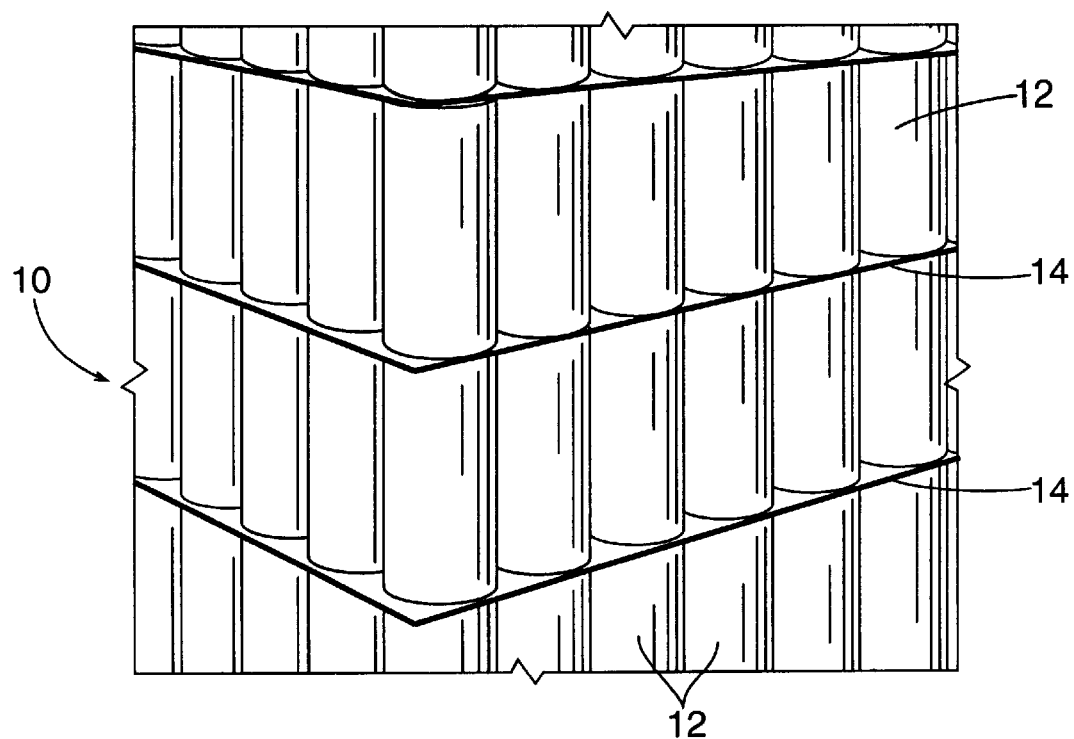
FIG. 1 is a perspective view of several groups of vertically stacked cans separated by separator sheets or pads of the present invention.

FIG. 1 illustrates vertically stacked groups of containers, indicated generally by the reference character 10, utilizing the separator sheets of the present invention. While it will be understood by those of ordinary skill in the art that the groups of containers 12 can be any practical size and shape, and can be made from various materials such as metals or glass, the containers contemplated by the present invention are frequently cans, such as aluminum cans for soda or beer. Furthermore, the cans 12 are generally open-ended because they have not yet been shipped to the filling facility. Separator sheets of the present invention are used to expedite this shipment.

In order to facilitate transport of the bundled cans 10, a group of cans 12 is placed upon a pallet, not shown, such that the cans 12 abut each other. A separator sheet 14 such as the separator sheet of the present invention is placed on top of cans 12, providing a base for a second group of cans 12. A second separator sheet 14 can then be placed on top of the second group of cans 12, and the process repeated as desired to form a bundle 10 which can be secured for shipment to the manufacturer. To secure the bundled cans 10, a top frame, not shown, is placed on top of the top group of cans 12 and strapped down. When packaged in this manner, a large number of cans may be transported at one time.

Figure 2:
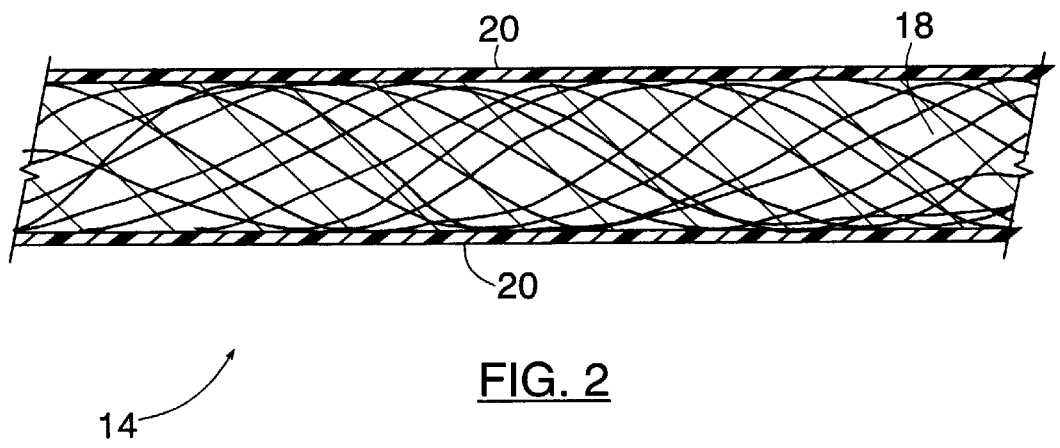
FIG. 2 is a cross-sectional view of the separator sheet or pad of the present invention.

FIG. 2 illustrates the composite separator sheet 14 of the present invention. Separator sheet 14 comprises a central core 18 of a nonwoven, spunbonded polymer fabric which contains a large number of continuous polymer filaments which are bonded using pressure or heat. The methods of making nonwoven, spunbonded polymer fabrics are well known to those of ordinary skill. The preferred polymer has a relatively low density such as polypropylene or another polyolefin. A suitable fabric is the nonwoven, spunbonded polypropylene TYPAR® which can be obtained from Reemay, Inc. of Old Hickory, Tenn.

Central core 18 is extrusion coated by pressing a molten polymer film 20 onto each side of core 18. Polymer film 20, which is liquid and gas impervious and preferably is polypropylene, permeates core fabric 18 only partially to ensure a product that is not overly rigid, which would be unsuitable. To produce a separator sheet having high static friction properties, polymer film 20 is pressed into central core 18 using a chill roll which has polished surfaces. The process of forming composite separator sheet 14 will be more completely described below with reference to FIG. 5.

In order to provide an optimum separator sheet 14, the basis weight and thickness should desirably be within a defined range. The basis weight of core fabric 18 is preferably from about six to about eleven ounces per square yard, and is optimally from about seven to about ten ounces per square yard. At basis weights below the desired range separator sheet 14 becomes too flimsy and therefore unsuitable for supporting groups of cans 12, and at basis weights above the desired range separator sheet 14 becomes too burdensome to handle and cut.

In addition to a proper basis weight, the thickness of polymer film 20 should be from about one to about four mils, with an overall thickness of separator sheet 14 being from about twenty to about forty mils. By having a separator sheet 14 of moderate thickness, it more easily supports cans 12 and prevents the open ends of cans 12, which are often sharp, from permanently damaging separator sheet 14.

Figure 3:
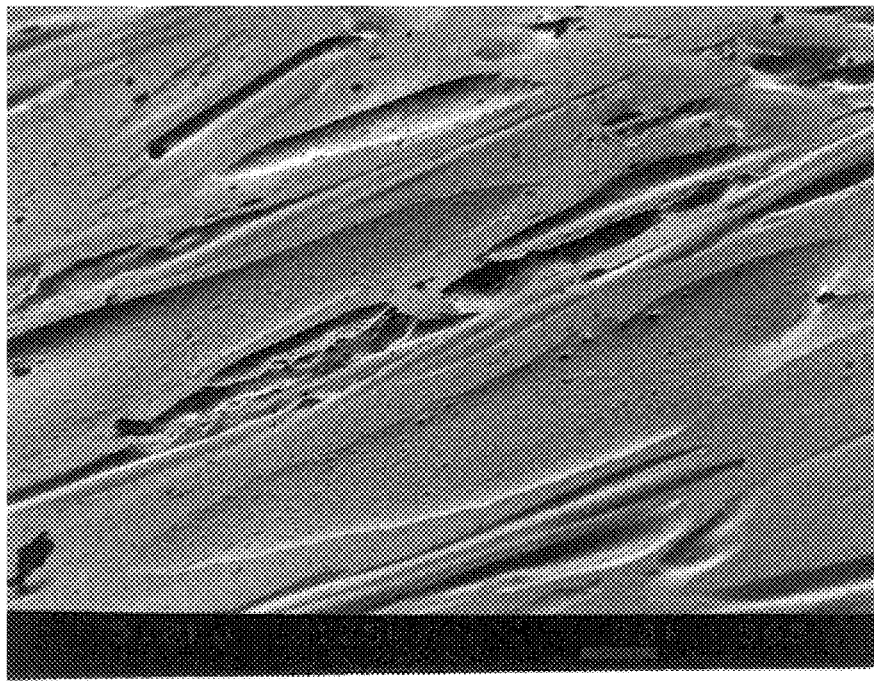
FIG. 3 is a photomicrograph showing the surface of the present invention separator sheet, which has a polished finish.
Figure 4:
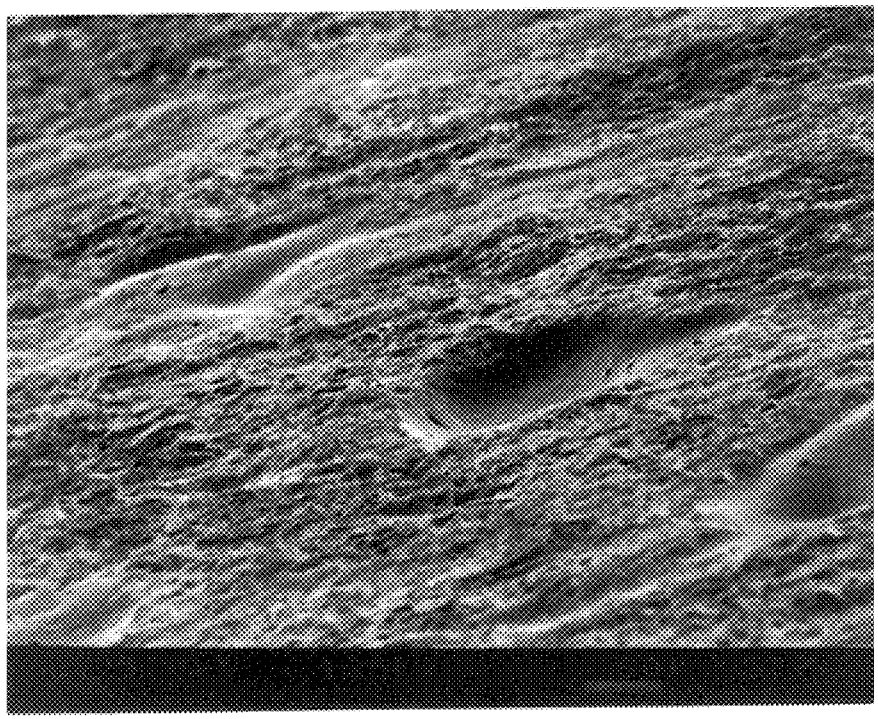
FIG. 4 is a photomicrograph showing the surface of a matte-finish separator sheet.

FIGS. 3 and 4 are photomicrographs depicting the surface topography of the gloss-finish sheet and matte-finish sheet, respectively. FIG. 3 shows the smoothness of the high friction gloss surface imparted on the separator pad of the present invention. Because the surface is smooth, it effectively increases the static and kinetic coefficients of friction. By having a smooth finish, the surface area contact between the sheet and the cans is increased, resulting in a higher static coefficient of friction and accordingly, superior can retention. In comparison, FIG. 4 shows the matte-finish separator pad, which has a finely roughened surface. The grainy surface of the matte-finish sheet reduces the contact between the sheet and the cans, thus reducing the static and kinetic coefficients of friction therebetween.

Table 1 below shows the relative static and kinetic coefficients of friction for (1) the gloss-finish separator sheet of the present invention, (2) a matte-finish separator sheet manufactured as described in U.S. Pat. No. 5,080,960, and (3) a chipboard separator sheet. The tests were conducted on a Thwing-Albert setup in accordance with ASTM test method D1894-93 utilizing a 200 g sled pulled horizontally across the sheet surface at a rate of six inches per minute. The friction coefficients were then recorded for both the jet side and the belt side of each separator sheet.

TABLE 1

Typical Static and Kinetic Coefficients of Friction

|  | JET SIDE | | BELT SIDE | |
| --- | --- | --- | --- | --- |
|  | STATIC | KINETIC | STATIC | KINETIC |
| Gloss-finish | 0.43 | 0.25 | 0.38 | 0.21 |
| Matte-finish | 0.30 | 0.16 | 0.29 | 0.15 |
| Chipboard | 0.39 | 0.29 | 0.30 | 0.21 |

As shown in Table 1, the coefficients of friction on the jet side of each sheet are similar to the coefficients on the belt side, with the jet side coefficient being slightly greater. While either the jet side or belt side perform satisfactorily, the data clearly demonstrate the advantageous friction properties of the gloss-finish separator sheet over the prior art sheets. The average static friction is increased to at least 0.35, and advantageously at least 0.37, while the kinetic friction is kept low, which facilitates palletizing and depalletizing operations. An average static coefficient of friction of at least 0.35 has been found to successfully hinder can fallout during pallet movement. As used herein, the phrase "average static coefficient of friction" refers to the arithmetic mean of the static coefficients of friction of at least ten separator sheets.

Table 2 below shows the 60° specular gloss values for three samples: (1) the gloss-finish separator sheet of the present invention, (2) a matte-finish separator sheet manufactured as described in U.S. Pat. No. 5,080,960, and (3) an extruded solid polypropylene sheet with a matte finish front surface and a gloss rear surface. The gloss measurements were made in accordance with ASTM test method D-523 (60° gloss) after the samples had been preconditioned by exposure to an atmosphere maintained at 73° F. 50% relative humidity for 24 hours.

TABLE 2

Typical 60° Gloss Measurements

| SAMPLE | FACE | BACK |
|---|---|---|
| 1 (the invention) | 23.8 | 30.2 |
| 2 (prior art) | 2.3 | 3.4 |
| 3 (film comparison) | 4.8 | 69.4 |

Figure 5:
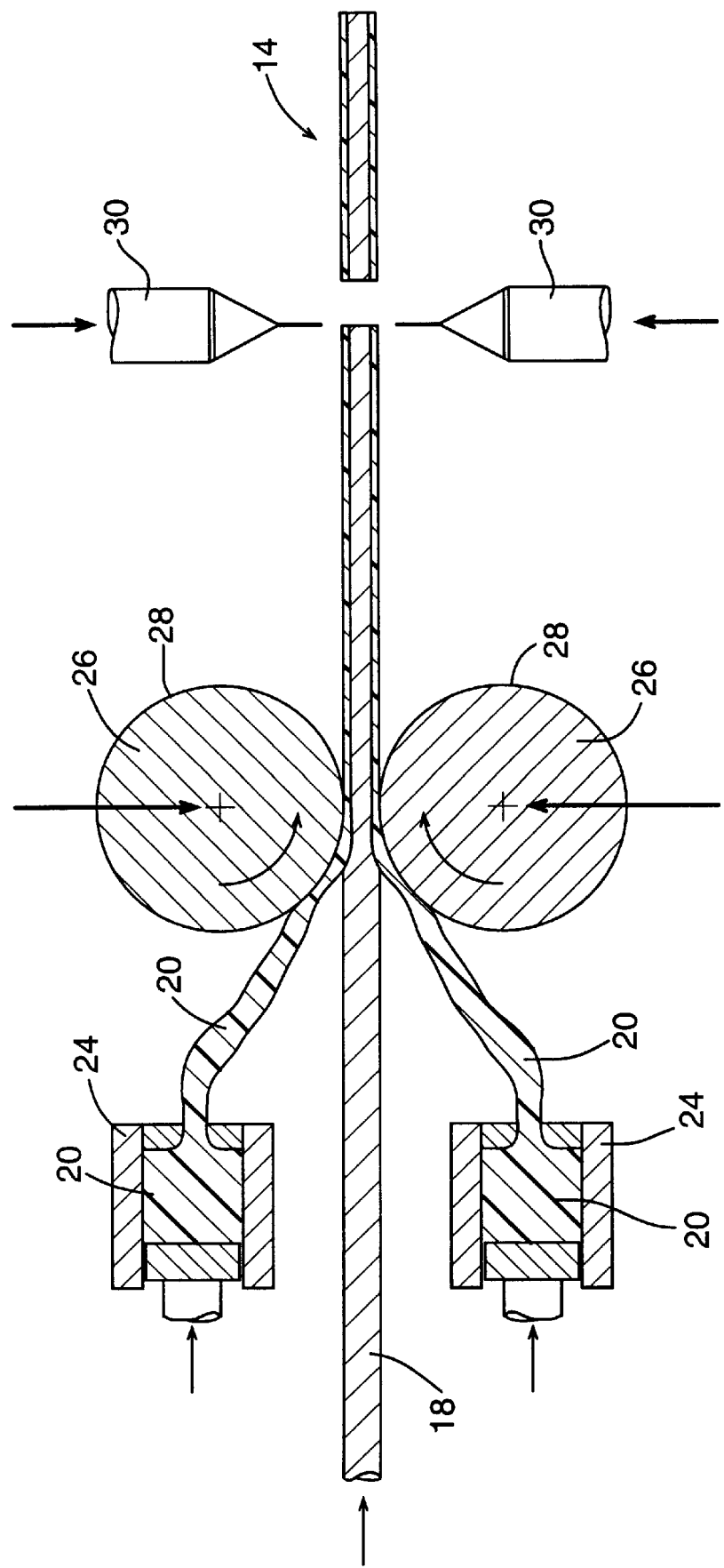
FIG. 5 is a schematic showing a chill roll pressing an extruded polymer onto both sides of a core layer to impart a high friction gloss surface onto the separator sheet of the present invention.

FIG. 5 illustrates a method for forming the high friction separator sheet 14 of the present invention. To form separator sheet 14, polymer film 20 is heated until molten and then extruded through an extrusion die 24. The molten polymer film 20 is then extrusion coated onto the central core 18 and hardened by contacting the polymer with chill rolls 26, forming a liquid and gas impervious polymer layer. Chill rolls 26 are preferably stainless steel water-cooled rolls. To impart the high friction gloss surface, the chill roll surface 28 of chill roll 26 must have a polished finish.

As central core 18 and polymer film 20 travel through chill rolls 26, the rolls 26 press the molten polymer film 20 onto the fabric core 18, simultaneously cooling the composite to form separator sheet 14. Following compression through chill rolls 26, the composite separator sheet 14 is cut into rectangles or other shapes using a cutting tool 30.

That which is claimed is:

1. A separator pad that is shape-retaining, tear-resistant, non-porous, non-toxic, and has a high friction surface, for use in separating vertically stacked groups of containers during packing and transport, said separator pad comprising a flexible sheet having opposing first and second sides, and a polymer layer overlying each of said first and second sides of said sheet, said polymer layer having a gloss finish imparting to the respective surfaces of the separator pad an average static coefficient of friction of at least 0.35, wherein said gloss finish has a 60° gloss value greater then 20.

2. The separator pad of claim 1, wherein said gloss finish further imparts to the respective surfaces of the separator pad an average kinetic coefficient of friction of at least 0.2.

3. The separator pad of claim 1, wherein said flexible sheet comprises a nonwoven spunbonded fabric having a basis weight of from about six to about eleven ounces per square yard, and said polymer layer comprises a polymer coating adhered to said nonwoven spunbonded fabric.

4. The separator pad of claim 1, wherein said nonwoven spunbonded fabric comprises polypropylene filaments.

5. A separator pad that is shape-retaining, tear-resistant, non-porous, non-toxic, and has a high friction surface, for use in separating vertically stacked groups of containers during packing and transport, said separator pad comprising a flexible sheet having opposing first and second sides, and a liquid and gas impervious polymer layer overlying each of said first and second sides of said sheet, said polymer layer having a gloss finish with a 60° gloss value greater than 20.

6. A separator pad that is shape-retaining, tear-resistant, non-porous, non-toxic, and has a high friction surface, for use in separating stacked groups of containers during packing and transport, said separator pad comprising a central core of spunbonded polypropylene fabric having a basis weight of from about six to about eleven ounces per square yard, and an outer layer of polypropylene on both sides of said fabric bonded thereto, said outer layer being impervious to gas and liquids, said pad having an overall thickness of from about 20 to about 40 mils, and said outer layer of polypropylene having a gloss finish imparting to the respective surfaces of the separator pad an average static coefficient of friction of at least about 0.35, wherein said gloss finish has a 60° gloss value greater then 20.

7. The separator pad of claim 6, wherein said gloss finish further imparts to the respective surfaces of the separator pad an average kinetic coefficient of friction of at least 0.2.

8. A stacked bundle of containers and separators that are shape-retaining, tear-resistant, non-porous, non-toxic, and have a high friction surface, comprising in combination a plurality of groups of containers arranged in a stacked relationship, and a separator pad disposed between adjacent groups of said containers, said separator pad comprising a flexible sheet having opposing first and second sides, and a polymer layer overlying each of said first and second sides of said sheet, said polymer layer having a gloss finish imparting to the respective surfaces of the separator pad an average static coefficient of friction of at least 0.35, wherein said gloss finish has a 60° gloss value greater than 20.

9. The stacked bundle of claim 8, wherein said gloss finish further imparts to the respective surfaces of the separator pad an average kinetic coefficient of friction of at least 0.2.

10. A stacked bundle of containers and separators that are shape-retaining, tear-resistant, non-porous, non-toxic, and have high friction surface, comprising in combination a plurality of groups of containers arranged in a stacked relationship, and a separator pad disposed between adjacent groups of said containers, said separator pad having stiffness to support the containers and comprising a central layer of spunbonded polypropylene fabric having a basis weight of from about six to about eleven ounces per square yard, and an outer continuous and gas and liquid impervious layer of polypropylene on both sides of said fabric, said impervious layer of polypropylene having a gloss finish imparting to the respective surfaces of the separator pad an average static coefficient of friction of at least 0.35, wherein said gloss finish has a 60° gloss value greater then 20.

11. The stacked bundle of claim 10, wherein said gloss finish further imparts to the respective surfaces of the separator pad an average kinetic coefficient of friction of at least 0.2.

* * * * *